(12) United States Patent
Liu et al.

(10) Patent No.: US 12,323,923 B2
(45) Date of Patent: *Jun. 3, 2025

(54) MAC CE FOR CONFIGURING PATHLOSS REFERENCE SIGNAL FOR PUSCH

(71) Applicant: Lenovo (Beijing) Ltd., Beijing (CN)

(72) Inventors: Bingchao Liu, Changping District (CN); Chenxi Zhu, Haidian District (CN); Lianhai Wu, Chaoyang (CN); Wei Ling, Changping (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 336 days.

This patent is subject to a terminal disclaimer.

(21) Appl. No.: 17/790,616

(22) PCT Filed: Jan. 3, 2020

(86) PCT No.: PCT/CN2020/070237
§ 371 (c)(1),
(2) Date: Jul. 1, 2022

(87) PCT Pub. No.: WO2021/134779
PCT Pub. Date: Jul. 8, 2021

(65) Prior Publication Data
US 2023/0039771 A1    Feb. 9, 2023

(51) Int. Cl.
*H04W 52/14*    (2009.01)
*H04W 52/24*    (2009.01)
*H04W 52/38*    (2009.01)

(52) U.S. Cl.
CPC ....... *H04W 52/146* (2013.01); *H04W 52/242* (2013.01); *H04W 52/38* (2013.01)

(58) Field of Classification Search
CPC . H04W 52/146; H04W 52/242; H04W 52/38; H04L 5/0048; H04L 5/0091
See application file for complete search history.

(56) References Cited

U.S. PATENT DOCUMENTS

| | | |
|---|---|---|
| 2018/0160379 A1 | 6/2018 | Yokomakura et al. |
| 2019/0281588 A1* | 9/2019 | Zhang .................. H04B 7/0617 |
| 2019/0349867 A1 | 11/2019 | Molavianjazi |
| 2023/0017292 A1* | 1/2023 | Liu ....................... H04L 5/0091 |

FOREIGN PATENT DOCUMENTS

| | | |
|---|---|---|
| CA | 3061633 A1 | 10/2019 |
| EP | 3567939 A1 | 11/2019 |
| WO | 2018203662 A1 | 11/2018 |

OTHER PUBLICATIONS 20911133.5 , "Extended European Search Report", EP Application No. 20911133.5, Sep. 1, 2023, 12 pages.

(Continued)

*Primary Examiner* — Ankur Jain
(74) *Attorney, Agent, or Firm* — FIG. 1 Patents

(57) ABSTRACT

Methods and apparatuses for configuring PUSCH pathloss reference signal for SRI PUSCH power control are disclosed. A method comprises configuring PUSCH pathloss reference signal for one or more SRI PUSCH power controls by using a MAC CE, and transmitting a PDSCH carrying the MAC CE.

20 Claims, 6 Drawing Sheets

| R | Serving cell ID | BWP ID | Oct 1 |
|---|---|---|---|
| R | R | PUSCH-PathlossReferenceRS-ID 0 | SRI PUSCH PowerControl ID$_0$ | Oct 2 |
| R | R | PUSCH-PathlossReferenceRS-ID 1 | SRI PUSCH PowerControl ID$_1$ | Oct 3 |
| ... | | | |
| R | R | PUSCH-PathlossReferenceRS-ID n | SRI PUSCH PowerControl ID$_2$ | Oct n+2 |
| ... | | | |
| R | R | PUSCH-PathlossReferenceRS-ID N-1 | SRI PUSCH PowerControl ID$_{N-1}$ | Oct N+1 |

(56) References Cited

OTHER PUBLICATIONS

3GPP, "Medium Access Control (MAC) protocol specification (1 of 3)", 3GPP TS 38.321, V15.7.0 Release 15 [retrieved Oct. 16, 2023]. Retrieved from the Internet <https://www.etsi.org/deliver/etsi_ts/138300_138399/138321/15.07.00_60/ts_138321v150700p.pdf> 1 of 3, Oct. 2019, 80 pages.

3GPP, "Medium Access Control (MAC) protocol specification (2 of 3)", 3GPP TS 38.321, V15.7.0 Release 15 [retrieved Oct. 16, 2023]. Retrieved from the Internet <https://www.etsi.org/deliver/etsi_ts/138300_138399/138321/15.07.00_60/ts_138321v150700p.pdf> 2 of 3, Oct. 2019, 23 pages.

3GPP, "Medium Access Control (MAC) protocol specification (3 of 3)", 3GPP TS 38.321, V15.7.0 Release 15 [retrieved Oct. 16, 2023]. Retrieved from the Internet <https://www.etsi.org/deliver/etsi_ts/138300_138399/138321/15.07.00_60/ts_138321v150700p.pdf> 3 of 3, Oct. 2019, 22 pages.

Huawei, et al., "MAC CE signalling for multi-beam enhancement", 3GPP TSG-RAN WG2 Meeting#108, R2-1914676, Reno, USA [retrieved Oct. 16, 2023]. Retrieved from the Internet <https://www.3gpp.org/ftp/tsg_ran/WG2_RL2/TSGR2_108/Docs>, Nov. 2019, 13 pages.

Catt, "Remaining Issues of NR Power Control", 3GPP TSG RAN WG1 Meeting #94bis, R1-1810525, Chengdu, China [retrieved Aug. 5, 2022]. Retrieved from the Internet <https://www.3gpp.org/ftp/tsg_ran/WG1_RL1/TSGR1_94b/Docs?sortby=sizerev>., Oct. 2018, 6 Pages.

Oppo, "Discussion on Multi-beam Operation Enhancements", 3GPP TSG RAN WG1 #99, R1-1911844, Reno, USA [retrieved Aug. 5, 2022] retrieved from the internet <https://www.3gpp.org/ftp/tsg_ran/WG1_RL1/TSGR1_99/Docs>., Nov. 2019, 13 Pages.

PCT/CN2020/070237, "International Preliminary Report on Patentability", PCT Application No. PCT/CN2020/070237, Jul. 14, 2022, 5 pages.

PCT/CN2020/070237, "International Search Report and Written Opinion", PCT Application No. PCT/CN2020/070237, Oct. 10, 2020, 6 pages.

ZTE, "Enhancements on multi-beam operation", 3GPP TSG RAN WG1 Meeting #98bis, R1-1910285, Chongqing, China [retrieved Aug. 5, 2022]. Retrieved from the internet <https://www.3gpp.org/ftp/tsg_ran/WG1_RL1/TSGR1_98b/Docs>., Oct. 2019, 24 Pages.

202080090878.2, "Foreign Office Action", CN Application No. 202080090878.2, Jun. 26, 2024, 13 pages.

Vivo, "Discussion on eMIMO MAC CE", 3GPP TSG-RAN WG2 Meeting #108, R2-1916259, Reno, USA [retrieved Nov. 17, 2023]. Retrieved from the Internet <https://www.3gpp.org/ftp/tsg_ran/WG2_RL2/TSGR2_108/Docs>, Nov. 2019, 7 pages.

ZTE, "Enhancements on multi-beam operation", 3GPP TSG RAN WG1 Meeting #99, R1-1911931, Reno, US [retrieved Jan. 29, 2023]. Retrieved from the Internet <https://www.3gpp.org/ftp/tsg_ran/WG1_RL1/TSGR1_99/Docs>., Nov. 2019, 18 Pages.

202080090878.2, "Foreign Office Action", CN Application No. 202080090878.2, Oct. 21, 2024, 12 pages.

\* cited by examiner

| | | | | | | | |
|---|---|---|---|---|---|---|---|

| R | Serving cell ID | | BWP ID | Oct 1 |
|---|---|---|---|---|
| R | R | PUSCH-PathlossReferenceRS-ID 0 | SRI PUSCH PowerControl $ID_0$ | Oct 2 |
| R | R | PUSCH-PathlossReferenceRS-ID 1 | SRI PUSCH PowerControl $ID_1$ | Oct 3 |

...

| R | R | PUSCH-PathlossReferenceRS-ID n | SRI PUSCH PowerControl $ID_2$ | Oct n+2 |
|---|---|---|---|---|

...

| R | R | PUSCH-PathlossReferenceRS-ID N-1 | SRI PUSCH PowerControl $ID_{N-1}$ | Oct N+1 |
|---|---|---|---|---|

Figure 1

| R | Serving cell ID | | | | | BWP ID | | Oct 1 |
|---|---|---|---|---|---|---|---|---|
| $t_7$ | $t_6$ | $t_5$ | $t_4$ | $t_3$ | $t_2$ | $t_1$ | $t_0$ | Oct 2 |
| $t_{15}$ | $t_{14}$ | $t_{13}$ | $t_{12}$ | $t_{11}$ | $t_{10}$ | $t_9$ | $t_8$ | Oct 3 |
| PUSCH-PathlossReferenceRS-ID$_5$ | | PUSCH-PathlossReferenceRS-ID$_3$ | | PUSCH-PathlossReferenceRS-ID$_2$ | | PUSCH-PathlossReferenceRS-ID$_0$ | | Oct 4 |
| ... | | | | | | | | |
| R | R | R | R | R | R | PUSCH-PathlossReferenceRS-ID$_i$ | | Oct N |

Figure 3

MAC CE FOR CONFIGURING PATHLOSS REFERENCE SIGNAL FOR PUSCH

FIELD

The subject matter disclosed herein generally relates to wireless communications, and more particularly relates to configuring pathloss reference signal for PUSCH.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Next Generation Node B (gNB), Orthogonal Frequency Division Multiplexing (OFDM), Radio Resource Control (RRC), Reference Signal (RS), Time-Division Duplex (TDD), Time Division Multiplex (TDM), User Entity/Equipment (Mobile Terminal) (UE), Uplink (UL), Universal Mobile Telecommunications System (UMTS), Long Term Evolution (LTE), Narrowband (NB), Physical Downlink Shared Channel (PDSCH), Physical Uplink Shared Channel (PUSCH), Physical Uplink Control Channel (PUCCH), Downlink control information (DCI), Physical Resource Block (PRB), Universal Mobile Telecommunications System (UMTS), Evolved-UMTS Terrestrial Radio Access (E-UTRA or EUTRA), Media Access Control (MAC), Control Element (CE), Bandwidth Part (BWP), Technical specification (TS), pathloss reference signal (PL-RS), Sounding Reference Signal (SRS), Synchronization Signal Block (SSB), Non Zero Power (NZP), Channel State Information (CSI), Reference Signal (RS), semi-persistent SRS (SP SRS), aperiodic SRS (AP SRS), component carrier (CC).

In Release 15, up to 4 PUSCH pathloss reference signals (PUSCH-PathlossReferenceRSs) can be configured for a UE on a BWP by RRC. Each SRI (SRS resource indicator) field value included in DCI format 0_1 is mapped to a PUSCH-PathlossReferenceRS value by the higher layer parameters SRI-PUSCH-PowerControl configured by RRC signaling. For each PUSCH transmission, the UE can determine the PL-RS for pathloss estimation according to the SRI field in DCI format 0_1 and the higher layer parameters SRI-PUSCH-PowerControl configured by RRC signaling. For UL beam management latency and overhead reduction, the configuration of PL-RS by RRC signaling is not desirable, because a RRC signaling consumes about 100 ms. During this time period, the required pathloss reference signal may be changed and the configured pathloss reference signal may not be suitable. Therefore, a new more efficient mechanism is necessary to indicate (or update) the PL-RS for PUSCH quickly.

It is therefore an object of the present invention to provide methods and apparatuses to implement indication (or update) of pathloss reference signal for PUSCH.

BRIEF SUMMARY

Methods and apparatuses for configuring PUSCH pathloss reference signal for SRI PUSCH power control are disclosed.

In one embodiment, a method comprises configuring PUSCH pathloss reference signal for one or more SRI PUSCH power controls by using a MAC CE, and transmitting a PDSCH carrying the MAC CE.

In one embodiment, the MAC CE includes one or more SRI-PUSCH-PowerControl IDs each of which indicates a SRI PUSCH power control for which the MAC CE applies. The MAC CE may further include one or more PUSCH pathloss reference signal IDs each of which indicates a pathloss reference signal mapped to the SRI PUSCH power control indicated by the SRI-PUSCH-PowerControl ID in the MAC CE.

In some embodiment, each PUSCH pathloss reference signal ID is directly indicated by a 2-bits field. Alternatively, the configured PUSCH pathloss reference signals for each SRI-PUSCH-PowerControl ID are indicated by a 4-bits bitmap, each bit indicates an activation status of a configured PUSCH pathloss reference signal, and only a single bit is activated for the SRI PUSCH power control indicated by said each SRI-PUSCH-PowerControl ID.

In some embodiment, each SRI-PUSCH-PowerControl ID is directly indicated by a 4-bits field. Alternatively, the MAC CE includes a bitmap of each which is 1 bit, indicates a SRI-PUSCH-PowerControl ID, each $t_i$ indicates whether the MAC CE applies to the SRI PUSCH power control with the SRI-PUSCH-PowerControl ID being equal to i.

In another embodiment, the MAC CE includes a serving cell ID, when the serving cell ID is within a simultaneousSpatialRelationCellList, the PUSCH pathloss reference signal is mapped to all SRI PUSCH power controls with the same SRI-PUSCH-PowerControl ID for all BWPs in all the cells within the simultaneousSpatialRelationCellList containing the serving cell ID.

In one embodiment, a base unit comprises a processor for configuring PUSCH pathloss reference signal for one or more SRI PUSCH power controls by using a MAC CE, and a transmitter for transmitting a PDSCH carrying the MAC CE.

In another embodiment, a method comprises receiving a PDSCH carrying a MAC CE, wherein the MAC CE is used to configure PUSCH pathloss reference signal for one or more SRI PUSCH power controls.

In yet another embodiment, a remote unit comprises a receiver for receiving a PDSCH carrying a MAC CE, wherein the MAC CE is used to configure PUSCH pathloss reference signal for one or more SRI PUSCH power controls.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1 illustrates an example of PUSCH pathloss reference signal indication MAC CE according to a first embodiment;

FIG. 3 illustrates an example of PUSCH pathloss reference signal indication MAC CE according to a third embodiment;

DETAILED DESCRIPTION

Figure 2:
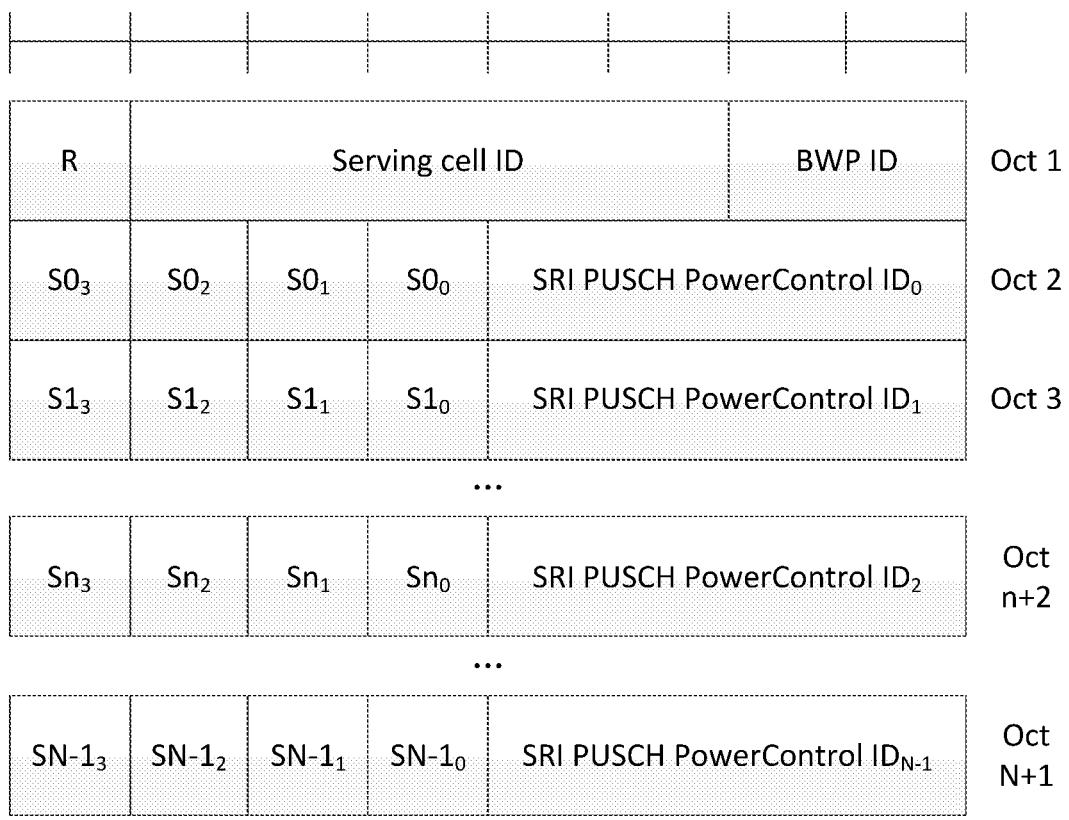
FIG. 2 illustrates an example of PUSCH pathloss reference signal indication MAC CE according to a second embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

MAC CE can perform transmission faster than RRC signaling. Therefore, the present invention proposes to configure PL-RS for PUSCH by using a MAC CE, and transmit a PDSCH carrying the MAC CE from the base unit (e.g. gNB) to the remote unit (e.g. UE).

Up to 4 PUSCH pathloss reference signals (PUSCH-PathlossReferenceRSs) can be configured for a UE in a BWP on a serving cell. Each SRI value indicated by the SRI ('SRS resource indicator') field in DCI format 0_1 is mapped to a SRI-PUSCH-PowerControlId for the scheduling PUSCH transmission. Each SRI-PUSCH-PowerControlId maps to a PUSCH-PathlossReferenceRSId. Therefore, by updating the mapping between SRI-PUSCH-PowerControlId and PUSCH-PathlossReferenceRSId in the MAC CE, the relationship between each SRI value and PUSCH-PathlossReferenceRS can be updated. The 'SRS resource indicator' field value indicates the spatial relation and the antenna port(s) on which PUSCH is transmitted.

An example of the PUSCH pathloss reference signal indication MAC CE according to the first embodiment is illustrated in FIG. 1. The MAC CE according to the first embodiment is used to indicate or update the PUSCH pathloss reference signal mapped to each of one or more SRI PUSCH power controls. The following fields are included in the MAC CE according to the first embodiment:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

(3) SRI PUSCH PowerControl ID$_i$: Each SRI PUSCH PowerControl ID$_i$ indicates a SRI PUSCH power control (SRI-PUSCH-PowerControl) with SRI-PUSCH-PowerControlId value for which this MAC CE applies. The length of each SRI PUSCH PowerControl ID$_i$ field is 4 bits, as a maximum of 16 SRI-PUSCH-PowerControls may be configured for a UE in a BWP according to UE capability. There might be as many as 16 SRI PUSCH PowerControl ID$_i$ in the PUSCH pathloss reference signal indication MAC CE according to the first embodiment. The number of the SRI PUSCH PowerControl ID$_i$ included in the MAC CE according to the first embodiment can be determined by the corresponding subheader of this MAC CE.

(4) PUSCH-PathlossReferenceRS-ID$_i$: Each PUSCH-PathlossReferenceRS-ID$_i$ contains an identifier of the PUSCH pathloss reference signal (PUSCH-PathlossReferenceRS) mapped to SRI PUSCH power control indicated by the SRI PUSCH PowerControl ID$_i$ field (that has the same index i as the index of the PUSCH-PathlossReferenceRS-ID$_i$). The length of each PUSCH-PathlossReferenceRS-ID$_i$ field is 2 bits, as up to 4 PUSCH-PathlossReferenceRSs can be configured for a UE in a BWP according to UE capability.

(5) R: Reserved bit. Each of the reserved bits may be set to "0".

The PUSCH pathloss reference signal indication MAC CE according to the first embodiment has a size of 8+8*N bits, in which N is the number of the SRI PUSCH power controls to which PUSCH pathloss reference signal is to be mapped, and N ranges from 1 to 16.

FIG. 2 illustrates an example of the PUSCH pathloss reference signal indication MAC CE according to the second embodiment. The MAC CE according to the second embodiment is used to indicate or update the PUSCH pathloss reference signal (PUSCH-PathlossReferenceRS) mapped to each of SRI PUSCH power controls indicated by SRI PUSCH PowerControl $ID_i$. The following fields are included:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

(3) SRI PUSCH PowerControl $ID_i$: Each SRI PUSCH PowerControl $ID_i$ indicates a SRI PUSCH power control with SRI-PUSCH-PowerControlId value for which this MAC CE applies. The length of each SRI PUSCH PowerControl $ID_i$ field is 4 bits, as a maximum of 16 SRI-PUSCH-PowerControls may be configured for a UE in a BWP according to UE capability. There might be as many as 16 SRI PUSCH PowerControl $ID_i$ in the PUSCH pathloss reference signal indication MAC CE according to the second embodiment. The number of the SRI PUSCH PowerControl $ID_i$ included in the MAC CE according to the second embodiment can be determined by the corresponding sub-header of this MAC CE.

The above fields (1)-(3) according to the second embodiment are the same as the fields (1)-(3) according to the first embodiment.

(4) $Sn_i$: Up to 4 PUSCH-PathlossReferenceRSs are indicated by a 4-bit bitmap. That is, each of four $Sn_i$ fields (i=0, 1, 2, 3) indicates a configured PUSCH-PathlossReferenceRS for the SRI PUSCH power control indicated by the SRI PUSCH PowerControl $ID_n$ field. The $Sn_i$ field is set to 1 to indicate that PUSCH-PathlossReferenceRS with PUSCH-PathlossReferenceRSId that is equal to i shall be activated and mapped to SRI-PUSCH-PowerControlId indicated by the SRI PUSCH PowerControl $ID_n$ field. The $Sn_i$ field is set to 0 to indicate that PUSCH-PathlossReferenceRS with PUSCH-SpatialRelationInfoId that is equal to i shall be deactivated for SRI-PUSCH-PowerControlId indicated by the SRI PUSCH PowerControl $ID_n$ field. Only a single PUSCH-PathlossReferenceRS can be active and mapped to a SRI-PUSCH-PowerControlId at a time. That is, only one of four $Sn_i$ fields (i=0, 1, 2, 3) can be set to 1 while the other three will be set to 0.

(5) R: Reserved bit. Each of the reserved bits may be set to "0".

The PUSCH pathloss reference signal indication MAC CE according to the second embodiment has a size of 8+8*N bits, in which N is the number of the SRI PUSCH power controls to which PUSCH pathloss reference signal is to be mapped, and N ranges from 1 to 16.

FIG. 3 illustrates an example of the PUSCH pathloss reference signal indication MAC CE according to the third embodiment. As shown in FIG. 3, all SRI PUSCH PowerControl IDs are listed in the MAC CE using a bitmap, in which each SRI PUSCH PowerControl ID is represented by a single bit, i.e. $t_i$ field ($t_0$ to $t_{15}$). The $t_i$ field indicates whether this MAC CE applies to the SRI PUSCH PowerControl with the SRI PUSCH PowerControl ID equal to i. The $t_i$ field is set to 1 to indicate SRI PUSCH power control with the SRI PUSCH PowerControl ID equal to i shall be activated (i.e. indicated or updated with a PUSCH pathloss reference signal). The PUSCH-PathlossReferenceRS-$ID_i$ field indicates a PUSCH-PathlossReferenceRS-ID used as a PUSCH pathloss reference signal for the $i^{th}$ SRI PUSCH power control activated with $t_i$ field (i.e. $t_i$=1). The $t_i$ field is set to 0 to indicate SRI PUSCH power control with the SRI PUSCH PowerControl ID equal to i shall be deactivated (i.e. the mapped PUSCH Pathloss Reference signal is not updated by this MAC CE). In other words, when $t_i$=1, a PUSCH-PathlossReferenceRS-$ID_i$ field is included to indicate the PUSCH pathloss reference signal to be mapped to the SRI PUSCH power control indicated by $t_i$. On the other hand, when $t_i$=0, no PUSCH-PathlossReferenceRS-$ID_i$ field is included.

As shown in FIG. 3, PUSCH-PathlossReferenceRS-$ID_0$ field, PUSCH-PathlossReferenceRS-$ID_2$ field, PUSCH-PathlossReferenceRS-$ID_3$ field and PUSCH-PathlossReferenceRS-$ID_5$ field are included in the example of the PUSCH pathloss reference signal indication MAC CE according to the third embodiment. Therefore, $t_0$, $t_2$, $t_3$ and $t_5$ are equal to 1. On the other hand, PUSCH-PathlossReferenceRS-$ID_1$ and PUSCH-PathlossReferenceRS-$ID_4$ are not included in the example of the PUSCH pathloss reference signal indication MAC CE according to the third embodiment. Therefore, $t_1$ and $t_4$ are equal to 0.

The PUSCH-PathlossReferenceRS-$ID_i$ fields, if included, are included in a sequential manner (from the lowest number 0 to the highest number 15). For example, as shown in FIG. 3, PUSCH-PathlossReferenceRS-$ID_3$ field, PUSCH-PathlossReferenceRS-$ID_2$ field, PUSCH-PathlossReferenceRS-$ID_3$ field and PUSCH-PathlossReferenceRS-$ID_5$ field are sequentially included, as neither PUSCH-PathlossReferenceRS-$ID_1$ field nor PUSCH-PathlossReferenceRS-$ID_4$ field is included.

In particular, the following fields are included in the PUSCH pathloss reference signal indication MAC CE according to the third embodiment:

(1) Serving Cell ID: This field indicates the identity of the serving cell for which the MAC CE applies. The length of the Serving Cell ID field is 5 bits.

(2) BWP ID: This field indicates a UL BWP for which the MAC CE applies as the codepoint of the DCI bandwidth part indicator field. The length of the BWP ID field is 2 bits.

The above fields (1)-(2) according to the third embodiment are the same as the fields (1)-(2) according to the first embodiment.

(3) $t_i$ field (i.e. $t_0$ to $t_{15}$): each $t_i$ field, which is 1 bit, indicates whether the PUSCH pathloss reference signal mapped to the SRI PUSCH power control is indicated or updated by this MAC CE. $t_i$ field is set to 1 when the PUSCH pathloss reference signal mapped to the SRI PUSCH power control is to be updated with a PUSCH pathloss reference signal indicated by a PUSCH-PathlossReferenceRS-$ID_i$ field. $t_i$ field is set to 0 when the PUSCH pathloss reference signal mapped to the SRI PUSCH power control is not updated by this MAC CE (i.e. maintained with the existing PUSCH pathloss reference signal). No PUSCH-PathlossReferenceRS-$ID_i$ field is included when $t_i$ field is set to 0.

(4) PUSCH-PathlossReferenceRS-$ID_i$ (i.e. at least one of PUSCH-PathlossReferenceRS-$ID_0$ to PUSCH-PathlossReferenceRS-$ID_{15}$) field: when $t_i$ field is set to 1, a PUSCH-PathlossReferenceRS-$ID_i$ field is included to indicate a PUSCH pathloss reference signal to be mapped to the SRI PUSCH power control indicated by $t_i$. Each of the PUSCH-PathlossReferenceRS-$ID_i$ fields is 2 bits.

(5) R: Reserved bit. Each of the reserved bits may be set to "0".

According to the third embodiment, the PUSCH pathloss reference signal indication MAC CE has a size of 32 bits (when the number of SRI PUSCH power controls to which the PUSCH pathloss reference signal is indicated or updated is 1 to 4, i.e. the number of $t_i$ being equal to 1 is 1 to 4), or 40 bits (when the number of $t_i$ being equal to 1 is 5 to 8) or 48 bits (when the number of $t_i$ being equal to 1 is 9 to 12), or 56 bits (when the number of $t_i$ being equal to 1 is 13 to 16). That is, the MAC CE according to the third embodiment has a size of 24+8*(N−3) bits, in which N ranges from 4 to 7.

In the first to the third embodiments, each SRI PUSCH power control is individually indicated or updated with a PUSCH pathloss reference signal. This may be inefficient if a plurality of SRI PUSCH power controls configured for different BWPs in different cells are to be indicated or updated with the same PUSCH pathloss reference signal.

According to a fourth embodiment, all of SRI PUSCH power controls configured in all BWPs on multiple cells with the same SRI PUSCH PowerControl ID may be indicated or updated with the same PUSCH pathloss reference signal.

It has been agreed that simultaneous spatial relation update for SP and/or AP SRS resource across multiple CCs/BWPs by a MAC CE is supported. Up to 2 lists of CCs, e.g. simultaneousSpatialRelationCellList0 and simultaneousSpatialRelationCellList1, can be configured by RRC per UE. It means that aperiodic and/or semi-persistent SRS resources in all BWPs on all cells contained in a simultaneousSpatialRelationCellList with the same SRS resource ID can share the same spatial relation for transmission.

When one or more simultaneousSpatialRelationCellList (s) (i.e. simultaneousSpatialRelationCellList0 and/or simultaneousSpatialRelationCellList1) are configured for a UE, and the UE receive a PUSCH pathloss reference signal indication MAC CE, if the serving cell ID indicated by the serving cell ID field in the MAC CE is included in one simultaneousSpatialRelationCellList, the indicated pathloss reference signal is mapped to all the SRI PUSCH power controls with the same SRI-PUSCH-PowerControlId indicated by the SRI PUSCH Power control ID field for all BWPs in all the cells within this simultaneousSpatialRelationCellList containing the serving cell ID.

The PUSCH pathloss reference signal indication MAC CE according to the fourth embodiment has the same structure as any of the PUSCH pathloss reference signal indication MAC CEs according to the first to the third embodiments. In the first to the third embodiments, one PUSCH pathloss reference signal (each of PUSCH pathloss reference signals indicated by PUSCH-PathlossReferenceRS-ID$_i$ in the first embodiment and the third embodiment, each of PUSCH pathloss reference signals indicated by SN$_i$ in the second embodiment) is mapped to only one SRI PUSCH power control. However, in the fourth embodiment, according to the Serving cell ID field included in the MAC CE, one PUSCH pathloss reference signal may be mapped to a multiple of SRI PUSCH power controls, i.e. all the SRI PUSCH power controls with the same SRI PUSCH PowerControl ID for all BWPs in all the cells within a simultaneousSpatialRelationCellList containing the serving cell ID indicated in the Serving cell ID field.

For example, suppose cell 1, cell 2 and cell 3 are within simultaneousSpatialRelationCellList0, and the Serving cell ID of the PUSCH pathloss reference signal indication MAC CE according to the fourth embodiment is cell 1. In this condition, the PUSCH pathloss reference signal indicated by PUSCH-PathlossReferenceRS-ID$_i$ (e.g. PUSCH-Pathloss-ReferenceRS-ID$_i$, or SN$_i$) included in the MAC CE according to the fourth embodiment is mapped to the SRI PUSCH power controls with the same SRI PUSCH PowerControl ID$_i$ for all BWPs (e.g. BWP1, BWP2, BWP3 and BWP4) of all the cells within simultaneousSpatialRelationCellList0 (e.g. cell 1, cell2 and cell3)

Figure 4:
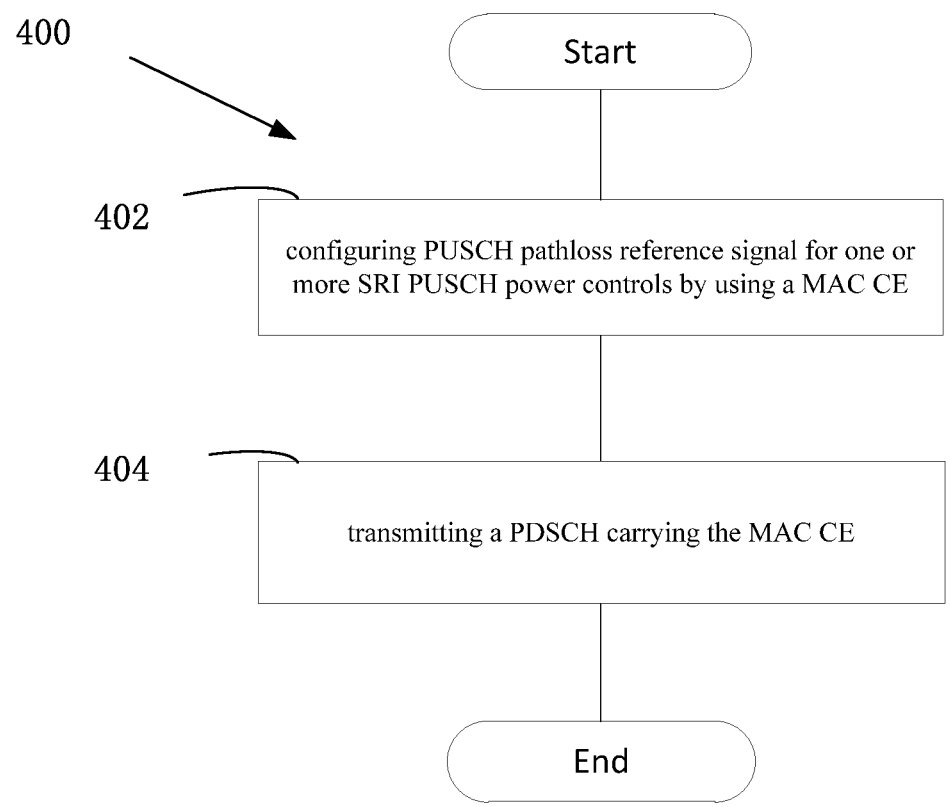
FIG. 4 is a schematic flow chart diagram illustrating an embodiment of a method for configuring pathloss reference signal for PUSCH.

FIG. 4 is a schematic flow chart diagram illustrating an embodiment of a method 400 for configuring PUSCH pathloss reference signal for SRI PUSCH power control. In some embodiments, the method 400 is performed by an apparatus, such as a base unit. In certain embodiments, the method 400 may be performed by a processor executing program code, for example, a microcontroller, a microprocessor, a CPU, a GPU, an auxiliary processing unit, a FPGA, or the like.

The method 400 may include 402 configuring PUSCH pathloss reference signal for one or more SRI PUSCH power controls by using a MAC CE and 404 transmitting a PDSCH carrying the MAC CE. The MAC CE can be a PUSCH pathloss reference signal indication MAC CE according to any of the first embodiment to the fourth embodiment.

Figure 5:
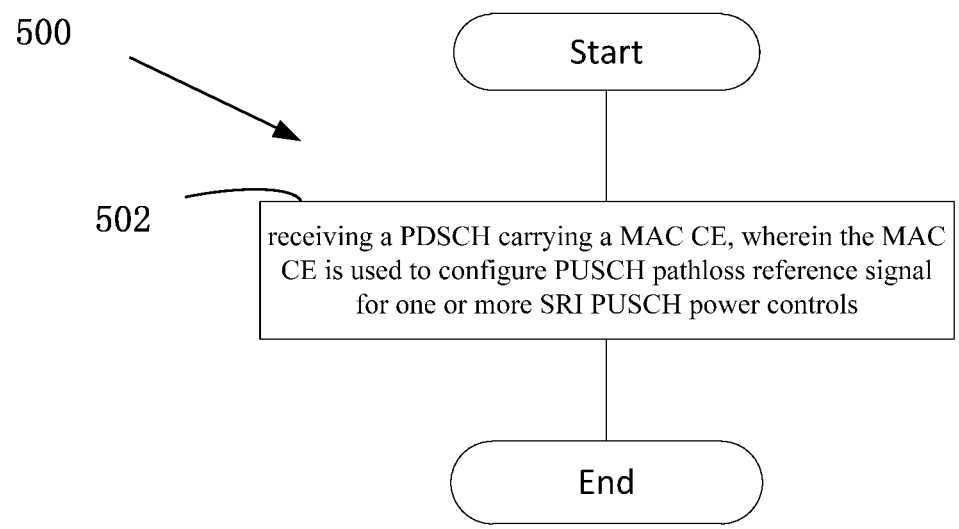
FIG. 5 is a schematic flow chart diagram illustrating a further embodiment of a method for configuring pathloss reference signal for PUSCH.

FIG. 5 is a schematic flow chart diagram illustrating an embodiment of a method 500 for configuring PUSCH pathloss reference signal for SRI PUSCH power control. In some embodiments, the method 500 is performed by an apparatus, such as a remote unit (UE). In certain embodiments, the method 500 may be performed by a processor executing program code, for example, a microcontroller, a microprocessor, a CPU, a GPU, an auxiliary processing unit, a FPGA, or the like.

The method 500 may include 502 receiving a PDSCH carrying a MAC CE, wherein the MAC CE is used to configure PUSCH pathloss reference signal for one or more SRI PUSCH power controls. The MAC CE can be a PUSCH pathloss reference signal indication MAC CE according to any of the first embodiment to the fourth embodiment.

Figure 6:
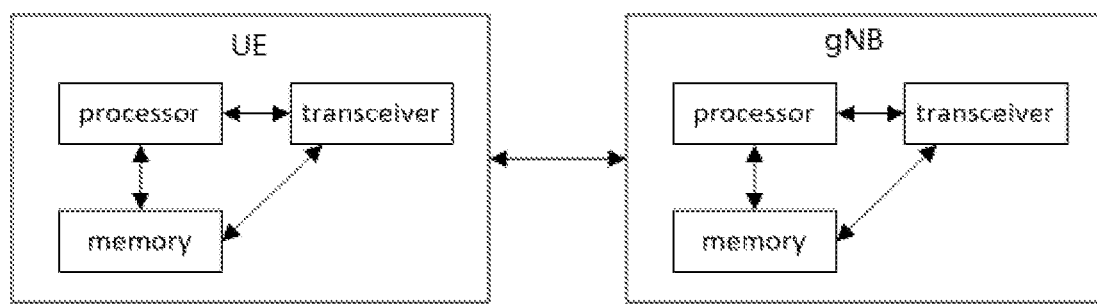
FIG. 6 is a schematic block diagram illustrating apparatuses according to one embodiment.

FIG. 6 is a schematic block diagram illustrating apparatuses according to one embodiment.

Referring to FIG. 6, the UE (i.e. the remote unit) includes a processor, a memory, and a transceiver. The processor implements a function, a process, and/or a method which are proposed in FIG. 5. The gNB (i.e. base unit) includes a processor, a memory, and a transceiver. The processors implement a function, a process, and/or a method which are proposed in FIG. 4. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base unit, the method comprising:
   configuring a physical uplink shared channel (PUSCH) pathloss reference signal for one or more sounding reference signal (SRS) resource indicator (SRI) PUSCH power controls using a media access control (MAC) control element (CE); and
   transmitting the MAC CE via a physical downlink shared channel (PDSCH), wherein the MAC CE indicates one or more SRI-PUSCH-PowerControl identifiers (IDs) corresponding to the one or more SRI PUSCH power controls, an SRI-PUSCH-PowerControl ID indicating an SRS PUSCH power control for which the MAC CE applies.

2. The method of claim 1, wherein the MAC CE further includes one or more PUSCH pathloss reference signal IDs each of which indicates a pathloss reference signal mapped to the SRI PUSCH power control indicated by the SRI-PUSCH-PowerControl ID in the MAC CE.

3. The method of claim 2, wherein each PUSCH pathloss reference signal ID is directly indicated by a 2-bits field.

4. The method of claim 2, wherein the configured PUSCH pathloss reference signal for each SRI-PUSCH-PowerControl ID is indicated by a 4-bits bitmap, wherein each bit indicates an activation status of a configured PUSCH pathloss reference signal, and only a single bit is activated for the SRI PUSCH power control indicated by the SRI-PUSCH-PowerControl ID.

5. The method of claim 1, wherein each SRI-PUSCH-PowerControl ID is directly indicated by a 4-bits field.

6. The method of claim 1, wherein the MAC CE includes a serving cell identifier (ID), and when the serving cell ID is within a simultaneousSpatialRelationCellList, the PUSCH pathloss reference signal is mapped to the SRI PUSCH power controls with a same SRI-PUSCH-PowerControl ID for all bandwidth parts (BWPs) in cells within the simultaneousSpatialRelationCellList containing the serving cell ID.

7. A base unit for wireless communication, comprising:
   at least one memory; and
   at least one processor coupled with the at least one memory and configured to cause the base unit to:
      configure a physical uplink shared channel (PUSCH) pathloss reference signal for one or more sounding reference signal (SRS) resource indicator (SRI) PUSCH power controls by using a media access control (MAC) control element (CE); and
      transmit the MAC CE via a physical downlink shared channel (PDSCH), wherein the MAC CE indicates one or more SRI-PUSCH-PowerControl identifiers (IDs) corresponding to the one or more SRI PUSCH power controls, an SRI-PUSCH-PowerControl ID indicating an SRS PUSCH power control for which the MAC CE applies.

8. The base unit of claim 7, wherein the MAC CE further includes one or more PUSCH pathloss reference signal IDs each of which indicates a pathloss reference signal mapped to the SRI PUSCH power control indicated by the SRI-PUSCH-PowerControl ID in the MAC CE.

9. The base unit of claim 8, wherein each PUSCH pathloss reference signal ID is directly indicated by a 2-bits field.

10. The base unit of claim 8, wherein the configured PUSCH pathloss reference signal for each SRI-PUSCH-PowerControl ID is indicated by a 4-bits bitmap, wherein each bit indicates an activation status of a configured PUSCH pathloss reference signal, and only a single bit is activated for the SRI PUSCH power control indicated by the SRI-PUSCH-PowerControl ID.

11. The base unit of claim 7, wherein each SRI-PUSCH-PowerControl ID is directly indicated by a 4-bits field.

12. The base unit of claim 7, wherein the MAC CE includes a serving cell identifier (ID), and when the serving cell ID is within a simultaneousSpatialRelationCellList, the PUSCH pathloss reference signal is mapped to the SRI PUSCH power controls with a same SRI-PUSCH-PowerControl ID for all bandwidth parts (BWPs) in cells within the simultaneousSpatialRelationCellList containing the serving cell ID.

13. A user equipment (UE) for wireless communication, comprising:
   at least one memory; and
   at least one processor coupled with the at least one memory and configured to cause the UE to:
      receive a media access control (MAC) control element (CE) via a physical downlink shared channel (PDSCH), wherein the MAC CE is used to configure a physical uplink shared channel (PUSCH) pathloss reference signal for one or more sounding reference signal (SRS) resource indicator (SRI) PUSCH power controls, and wherein the MAC CE indicates one or more SRI-PUSCH-PowerControl identifiers (IDs) corresponding to the one or more SRI PUSCH power controls, an SRI-PUSCH-PowerControl ID indicating an SRS PUSCH power control for which the MAC CE applies.

14. The UE of claim 13, wherein the MAC CE further includes one or more PUSCH pathloss reference signal IDs each of which indicates a pathloss reference signal mapped to the SRI PUSCH power control indicated by the SRI-PUSCH-PowerControl ID in the MAC CE.

15. The UE of claim 14, wherein each PUSCH pathloss reference signal ID is directly indicated by a 2-bits field.

16. The UE of claim 14, wherein the configured PUSCH pathloss reference signal for each SRI-PUSCH-PowerControl ID is indicated by a 4-bits bitmap, wherein each bit indicates an activation status of a configured PUSCH pathloss reference signal, and only a single bit is activated for the SRI PUSCH power control indicated by the SRI-PUSCH-PowerControl ID.

17. The UE of claim 13, wherein, the MAC CE includes a serving cell identifier (ID), and when the serving cell ID is within a simultaneousSpatialRelationCellList, the PUSCH pathloss reference signal is mapped to the SRI PUSCH power controls with a same SRI-PUSCH-PowerControl ID for all bandwidth parts (BWPs) in cells within the simultaneousSpatialRelationCellList containing the serving cell ID.

18. A processor for wireless communication, comprising:
at least one controller coupled with at least one memory and configured to cause the processor to:
configure a physical uplink shared channel (PUSCH) pathloss reference signal for one or more sounding reference signal (SRS) resource indicator (SRI) PUSCH power controls using a media access control (MAC) control element (CE); and
transmit the MAC CE via a physical downlink shared channel (PDSCH), wherein the MAC CE indicates one or more SRI-PUSCH-PowerControl identifiers (IDs) corresponding to the one or more SRI PUSCH power controls, an SRI-PUSCH-PowerControl ID indicating an SRS PUSCH power control for which the MAC CE applies.

19. The processor of claim 18, wherein the MAC CE further includes one or more PUSCH pathloss reference signal IDs each of which indicates a pathloss reference signal mapped to the SRI PUSCH power control indicated by the SRI-PUSCH-PowerControl ID in the MAC CE.

20. The processor of claim 19, wherein each PUSCH pathloss reference signal ID is directly indicated by a 2-bits field.

\* \* \* \* \*